United States Patent
Butz et al.

(10) Patent No.: US 6,894,611 B2
(45) Date of Patent: May 17, 2005

(54) METHOD AND SYSTEM FOR UPLOADING AND DOWNLOADING ENGINE CONTROL DATA

(75) Inventors: Mark Gerard Butz, Loveland, OH (US); Richard Francis Schuster, Loveland, OH (US); Kimberly Anne DePew, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/252,909

(22) Filed: Sep. 23, 2002

(65) Prior Publication Data

US 2004/0056766 A1 Mar. 25, 2004

(51) Int. Cl.⁷ ................................. H04Q 7/00
(52) U.S. Cl. ................... 340/539.1; 340/825.22; 340/945; 340/959; 340/973; 340/977; 701/1; 701/100
(58) Field of Search .................. 340/539.1, 825.22, 340/945, 955, 959, 961, 970, 539, 948, 951, 954, 958, 967, 973, 977; 123/406.12; 701/1, 100, 3, 29, 35, 99, 14, 15, 16, 10

(56) References Cited

U.S. PATENT DOCUMENTS

| | | | |
|---|---|---|---|
| 4,729,102 A | 3/1988 | Miller, Jr. et al. | |
| 5,893,040 A | * 4/1999 | Gunn et al. | 701/15 |
| 6,047,165 A | 4/2000 | Wright et al. | |
| 6,498,978 B2 | * 12/2002 | Leamy | 701/100 |
| 6,522,867 B1 | * 2/2003 | Wright et al. | 340/945 |
| 2002/0049055 A1 | * 4/2002 | Matthews et al. | 455/431 |

* cited by examiner

Primary Examiner—Jeffery Hofsass
Assistant Examiner—Daniel Previl
(74) Attorney, Agent, or Firm—William Scott Andes; Armstrong Teasdale LLP

(57) ABSTRACT

A method and system for transmitting engine control data to or from the engine control unit of an engine. The system includes a local communication unit capable of establishing a wireless communication link with a remote communication unit and a link for transferring data between the local communication unit and the engine control unit. In operation, a wireless communication link is established between the local communication unit and the remote communication unit. Engine control data is transferred between the local communication unit and the engine control unit and transmitted between the local communication unit and the remote communication unit via the wireless communication link.

22 Claims, 2 Drawing Sheets

METHOD AND SYSTEM FOR UPLOADING AND DOWNLOADING ENGINE CONTROL DATA

BACKGROUND OF THE INVENTION

This invention relates generally to engine controls and more particularly to transmitting engine control data.

Gas turbine engines are used for a wide variety of aeronautical, marine and industrial applications. Generally, a gas turbine engine includes a compressor that provides pressurized air to a combustor, wherein the air is mixed with fuel and the mixture is ignited for generating hot combustion gases. These gases flow downstream to a turbine section that extracts energy therefrom to drive the compressor and provide useful work.

Pulse detonation engines have also been proposed for many such applications. A pulse detonation engine uses an intermittent combustion process to create a temperature and pressure rise by detonating a flammable mixture. A pulse detonation engine is typically a tube of a specified length that is open at the aft end and includes some sort of valve device at the front end to keep the detonation process from traveling forward. A charge of air and fuel is fed into the tube through the valve, and the valve is then closed. Detonation of the fuel-air mixture is initiated by an igniter located in the tube, and the resulting detonation shock waves travel down the tube, raising both the temperature and the pressure of the products. The combustion products are expelled out of the open aft end, creating a pulse of forward thrust. When the shock waves have reflected within the tube to the appropriate conditions, a new charge is fed into the tube through the valve and the cycle repeats. It is generally desirable to generate pulses at a high frequency to produce smooth, nearly steady state propulsion.

These and other types of engines, particularly when used to power marine or aircraft, typically include an engine control unit (ECU) that contains software for controlling the engine and monitoring its performance. Periodically, software updates need to be uploaded into the program memory of the ECU. Current ECUs also contain maintenance logic that detects engine and aircraft faults. When an event occurs, engine and aircraft data are collected in a report that is stored in the ECU's memory. These reports are subsequently downloaded for use by ground personnel.

There are two current approaches to uploading and downloading engine control data. The first approach involves connecting a portable software loader to the ECU. A portable software loader is a conventional piece of hardware that includes a magnetic disk drive. To upload software updates, a disk containing the software to be loaded is inserted into the disk drive, and the software is transferred to the ECU's program memory via the connection to the ECU. To download fault reports, certain command signals are sent to the ECU, causing the fault reports to be transmitted from the ECU to a disk inserted in the portable software loader.

The second approach involves establishing a link between the ECU and an aircraft software loader. An aircraft software loader is a device that is installed on some newer airplanes. Although primarily used to update navigational databases, an aircraft software loader can also be used to update the ECU software. In which case, a disk containing the software to be loaded is inserted into the aircraft software loader's disk drive, and the software is transferred to the ECU's program memory via data buses between the aircraft software loader, the aircraft's data processor unit, and the ECU. Fault reports can also be transmitted from the ECU to a disk in the aircraft software loader via the same data buses.

There are logistical problems associated with both approaches. The first approach requires the engine cowlings to be opened in order to get access to the engine-mounted ECU. This approach may also require use of a power supply and other equipment to support the operation of the portable software loader. This approach can be time consuming because a stepladder is often needed to connect cables to the ECU. While the second approach does not require the engine cowlings to be opened, some equipment on the aircraft has to be powered and operational for data to be transferred between the ECU and the aircraft software loader. Furthermore, not all aircraft have an aircraft software loader installed, and of those that do, not all of the aircraft software loaders are linked to the ECU. Both approaches suffer from the fact that software loaders can fail to operate under extreme temperature conditions due to disk drive limitations.

Accordingly, it would be desirable to have a means for uploading and downloading data to and from ECUs that overcomes the drawbacks of the current approaches.

BRIEF SUMMARY OF THE INVENTION

The above-mentioned need is met by the present invention, which provides a method and system for transmitting engine control data to or from the engine control unit of an engine. The system includes a local communication unit capable of establishing a wireless communication link with a remote communication unit and means for transferring data between the local communication unit and the engine control unit. In operation, a wireless communication link is established between the local communication unit and the remote communication unit. Engine control data is transferred between the local communication unit and the engine control unit and transmitted between the local communication unit and the remote communication unit via the wireless communication link.

The present invention and its advantages over the prior art will be more readily understood upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
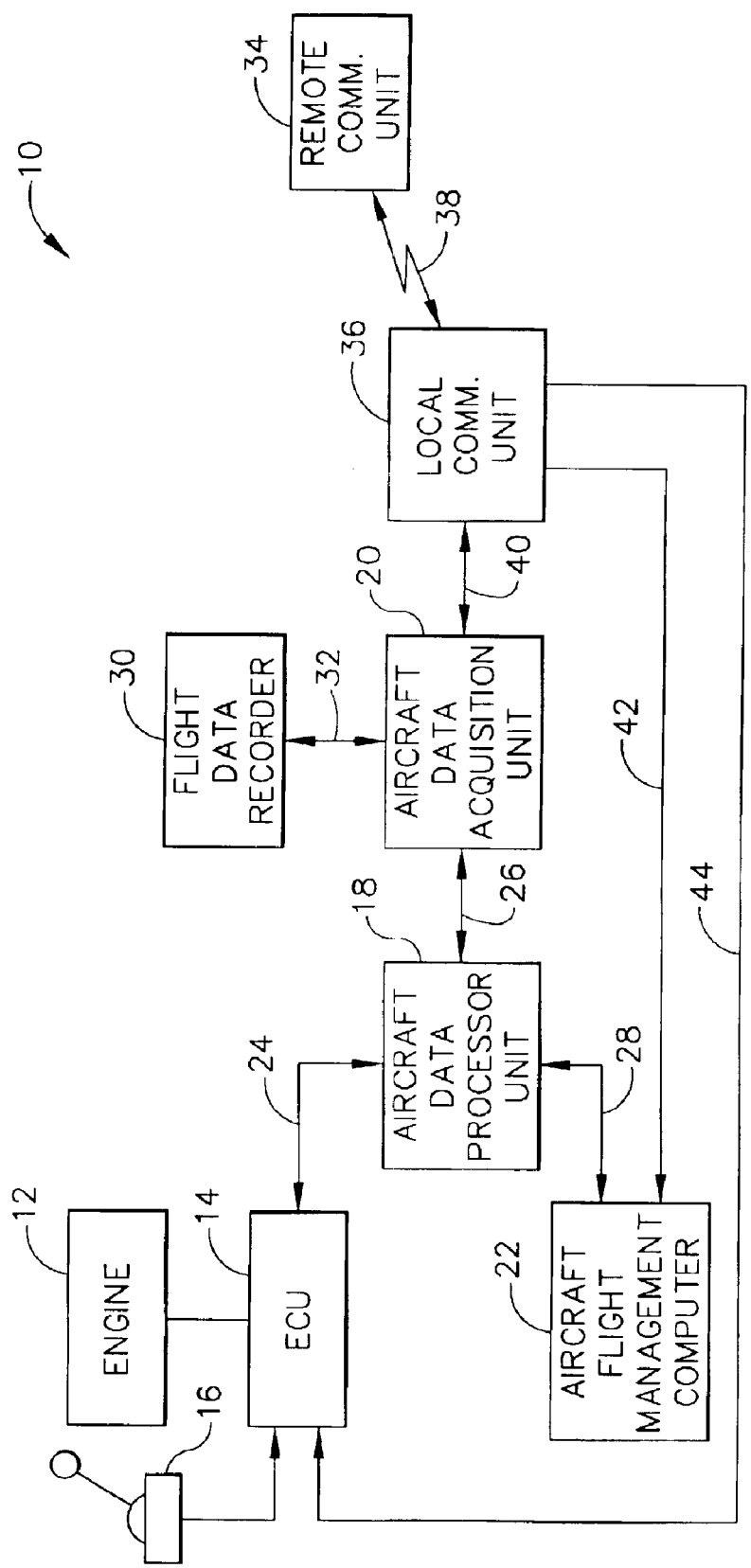
FIG. 1 is a schematic block diagram of a first embodiment of a system for transmitting engine control data.

Referring to the drawings wherein identical reference numerals denote the same elements throughout the various views, FIG. 1 shows a block diagram of a system 10 for transmitting (i.e., downloading and/or uploading) engine control data in connection with the operation of an engine 12. The engine 12 can be any type of engine such as a gas turbine engine, a pulse detonation engine or the like. As used herein, the term "engine control data" refers to any data that can be stored in, and transmitted to or from, an electronic control unit. Generally, an airline operator or data service provider would utilize the system 10 to direct data transmissions from a ground-based service center. The engine 12 is used to power a craft such as an aircraft or a marine vessel. For purposes of illustration only, the engine 12 is described in connection with an aircraft. However, it should be noted that the system 10 is applicable to other applications of engines, including marine and industrial applications.

The system 10 includes an electronic control unit (ECU) 14 such as a full authority digital engine control (FADEC) although other controllers can be used. As used herein, an ECU can be any electronic device that resides on or around an engine and contains software that is used to control and/or monitor the engine. Conventional engine and aircraft data sensors (not shown) are provided to sense selected data parameters related to the operation of the engine 12 and the aircraft. Such data parameters can include aircraft parameters such as altitude, ambient temperature, ambient pressure and air speed, and engine parameters such as exhaust gas temperature, oil temperature, component temperatures such as high pressure turbine shroud temperature, engine fuel flow, core speed, compressor discharge pressure, turbine exhaust pressure, fan speed, and the like. The ECU 14 receives signals from the engine and aircraft data sensors as is known in the art. The ECU 14 also receives a thrust request signal from a throttle 16 controlled by the aircraft's pilot. In response to these inputs, the ECU 14 generates command signals to operate engine actuators which meter the flow of fuel to the engine 12. The ECU 14 also contains maintenance logic that monitors parameters sensed by the engine and aircraft data sensors to detect engine and aircraft faults. When an event occurs, engine and aircraft data are collected in a fault report that is stored in the ECU's memory.

The system 10 comprises additional avionics equipment including an aircraft data processor unit 18, an aircraft data acquisition unit 20 and an aircraft flight management computer 22. The aircraft data processor unit 18 functions as a communication coordinator and is connected to the ECU 14 by a first data bus 24, to the aircraft data acquisition unit 20 by a second data bus 26, and to the aircraft flight management computer 22 by a third data bus 28. The aircraft data processor unit 18 receives engine data signals (e.g., exhaust gas temperature, oil temperature, engine fuel flow) and aircraft data signals (e.g., altitude, ambient temperature, and ambient pressure) from the ECU 14 via the first data bus 24. The aircraft data processor unit 18 also receives fault data from the ECU 14 via the first data bus 24. This data is processed by the aircraft data processor unit 18 and is then transmitted to the aircraft data acquisition unit 20 via the second data bus 26. The aircraft data acquisition unit 20 collects the engine, aircraft and fault data. Using the fault data to detect when an event occurs, the aircraft data acquisition unit 20 assembles the engine and aircraft data into a report format. These fault reports are fed to a high-density recording medium such as a flight data recorder 30 via a fourth data bus 32.

The aircraft flight management computer 22 processes a navigational database that integrates with the flight plan programmed by the pilot to facilitate auto-pilot operation. Wireless communication means are provided for uploading navigation data to the aircraft flight management computer 22 to periodically update the navigational database. The wireless communication means includes a remote communication unit 34 and a local communication unit 36 connected by a wireless communication link 38. The remote communication unit 34 is located on the ground (typically as part of a communication network connected to the service center of the airline operator or data service provider) and can thus also be referred to as the ground communication unit while the local communication unit 36 is located on the aircraft and can thus also be referred to as the aircraft communication unit. The local communication unit 36 is connected to the aircraft data acquisition unit 20 via a fifth data bus 40. Both the remote communication unit 34 and the local communication unit 36 can be standard wireless communication units comprising a transmitter, an antenna and a power amp as is known in the art. The wireless communication link 38 can utilize Very High Frequency (VHF) and satellite communication frequency equipment.

To update the navigational database, the airline operator or data service provider uses the remote communication unit 34 to upload navigation data to the local communication unit 36 via the wireless communication link 38. The uploaded navigation data is transferred from the local communication unit 36 to the aircraft flight management computer 22 via a sixth data bus 42. The aircraft flight management computer 22 can also use the wireless communication link 38 to download flight plan information to the remote communication unit 34. This flight plan data can then be transferred to the air traffic control system. In addition, fault reports generated by the aircraft data acquisition unit 20 can be transferred to the local communication unit 36 via the fifth data bus 40 so that the reports can be downloaded via the wireless communication link 38.

The system 10 is also capable of transmitting (i.e., uploading and/or downloading) engine control data between the airline operator or a data service provider and the ECU 14 using the wireless communication means. For example, when the wireless communication link 38 is established between the remote communication unit 34 and the local communication unit 36, data messages containing ECU data, such as ECU software updates, can be sent to the local communication unit 36 by the airline operator or data service provider. These messages are transferred from the local communication unit 36 to the ECU 14 through the fifth data bus 40, the aircraft data acquisition unit 20, the second data bus 26, the aircraft data processor unit 18, and the first data bus 24 using destination codes that are processed by the local communication unit 36. As an alternative to using intermediate avionics equipment (i.e., the aircraft data processor unit 18 and the aircraft data acquisition unit 20), the ECU data messages could be transferred from the local communication unit 36 to the ECU 14 via an optional seventh data bus 44 directly connected between the ECU 14 and the local communication unit 36. Upon successful completion of the data transfer and storage in the ECU memory, a message confirming the successful data transfer is transmitted from the ECU 14 to the airline operator or data service provider via the wireless communication link 38. A checksum value of the new ECU memory contents or other verification method could be part of the confirmation message. This process can be used to upload not only ECU software updates, but also adjustment values for engine control logic and information for future download reports.

The wireless communication link 38 can also be used to download ECU fault reports to the airline operator or data service provider. The ECU logic is set up to transmit fault data either immediately upon occurrence of an event, at a specific flight condition (e.g., descent or landing), or upon an uplinked request from the airline operator or data service provider. The fault report is transferred from the ECU 14 to the local communication unit 36 either via the seventh data bus 44 or through the first data bus 24, the aircraft data processor unit 18, the second data bus 26, the aircraft data acquisition unit 20, and the fifth data bus 40. The fault report is then transmitted from the local communication unit 36 to the remote communication unit 34 via the wireless communication link 38.

Figure 2:
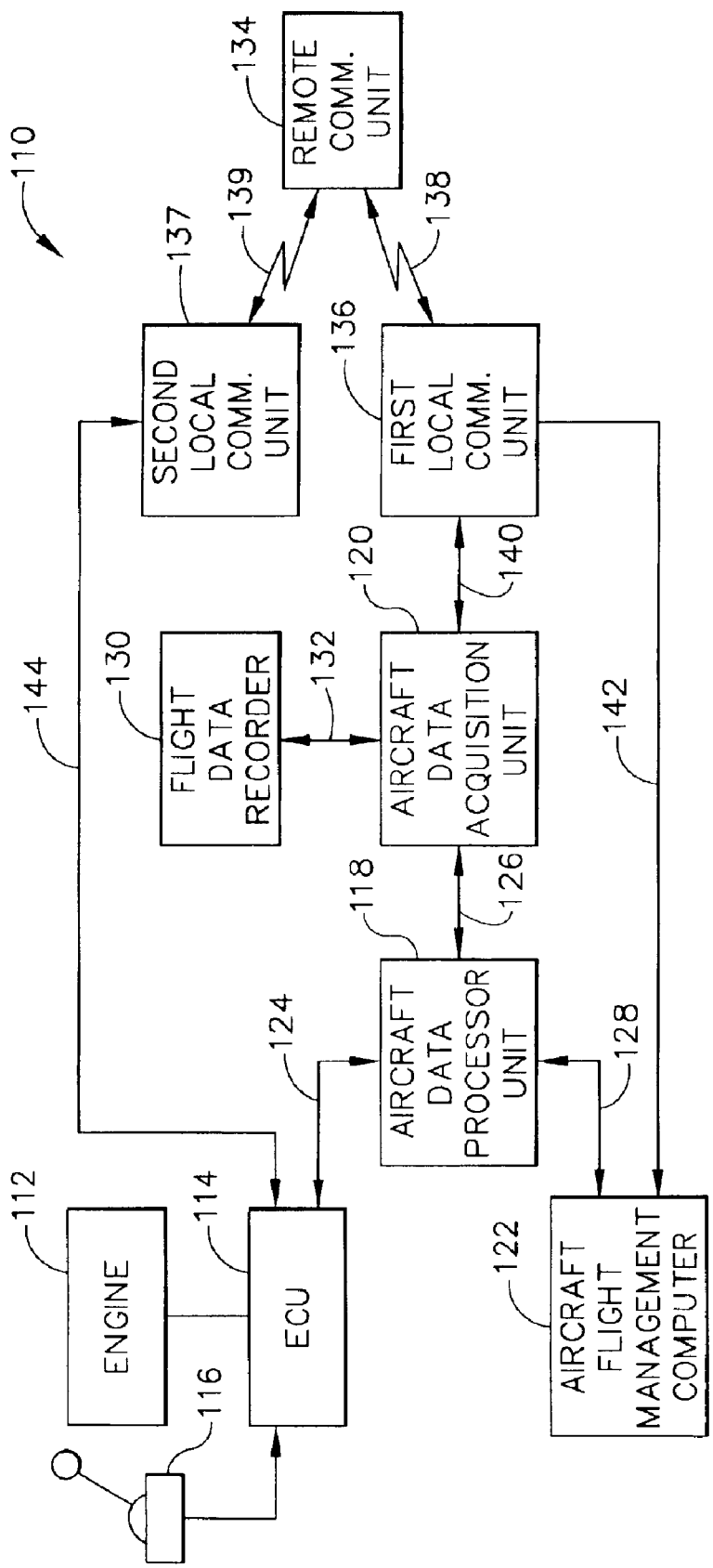
FIG. 2 is a schematic block diagram of a second embodiment of a system for transmitting engine control data.

Referring to FIG. 2, a second embodiment of a data transmitting system 110 is shown. The system 110 transmits (i.e., downloads and/or uploads) engine control data in connection with the operation of an engine 112. As in the first embodiment, the engine 112 is described as being used to power an aircraft for purposes of illustration only. However, it should be noted that the system 110 is applicable to other applications of engines, including marine and industrial applications.

The system 110 includes an electronic control unit (ECU) 114 such as a full authority digital engine control (FADEC) although other controllers can be used. As used herein, an ECU can be any electronic device that resides on or around an engine and contains software that is used to control and/or monitor the engine. Convention engine and aircraft data sensors (not shown) are provided to sense selected data parameters related to the operation of the engine 112 and the aircraft. Such data parameters can include aircraft parameters such as altitude, ambient temperature, ambient pressure and air speed, and engine parameters such as exhaust gas temperature, oil temperature, component temperatures such as high pressure turbine shroud temperature, engine fuel flow, core speed, compressor discharge pressure, turbine exhaust pressure, fan speed, and the like. The ECU 114 receives signals from the engine and aircraft data sensors as is known in the art. The ECU 114 also receives a thrust request signal from a throttle 116 controlled by the aircraft's pilot. In response to these inputs, the ECU 114 generates command signals to operate engine actuators which meter the flow of fuel to the engine 112. The ECU 114 also contains maintenance logic that monitors parameters sensed by the engine and aircraft data sensors to detect engine and aircraft faults. When an event occurs, engine and aircraft data are collected in a fault report that is stored in the ECU's memory.

The system 110 comprises additional avionics equipment including an aircraft data processor unit 118, an aircraft data acquisition unit 120 and an aircraft flight management computer 122. The aircraft data processor unit 118 functions as a communication coordinator and is connected to the ECU 114 by a first data bus 124, to the aircraft data acquisition unit 120 by a second data bus 126, and to the aircraft flight management computer 122 by a third data bus 128. The aircraft data processor unit 118 receives engine data signals (e.g., exhaust gas temperature, oil temperature, engine fuel flow) and aircraft data signals (e.g., altitude, ambient temperature, and ambient pressure) from the ECU 114 via the first data bus 124. The aircraft data processor unit 118 also receives fault data from the ECU 114 via the first data bus 124. This data is processed by the aircraft data processor unit 118 and is then transmitted to the aircraft data acquisition unit 120 via the second data bus 126. The aircraft data acquisition unit 120 collects the engine, aircraft and fault data. Using the fault data to detect when an event occurs, the aircraft data acquisition unit 120 assembles the engine and aircraft data into a report format. These fault reports are fed to a high-density recording medium such as a flight data recorder 130 via a fourth data bus 132.

The aircraft flight management computer 122 processes a navigational database that integrates with the flight plan programmed by the pilot to facilitate auto-pilot operation. Wireless communication means are provided for uploading navigation data to the aircraft flight management computer 122 to periodically update the navigational database. The wireless communication means includes a remote communication unit 134 and a first local communication unit 136 connected by a first wireless communication link 138. The wireless communication means also includes a second local communication unit 137 connected to the remote communication unit 134 by a second wireless communication link 139. The remote communication unit 134 is located on the ground (typically as part of a communication network connected to the service center of the airline operator or data service provider) and can thus also be referred to as the ground communication unit while the first and second local communication units 136 and 137 are located on the aircraft. The first local communication unit 136, which can also be referred to as the aircraft communication unit, is connected to the aircraft data acquisition unit 120 via a fifth data bus 140 and to the aircraft flight management computer 122 via a sixth data bus 142. The second local communication unit 137, which can also be referred to as the engine communication unit, is directly connected to the ECU 114 via a seventh data bus 144. The remote communication unit 134 and the local communication units 136, 137 can be standard wireless communication units comprising a transmitter, an antenna and a power amp as is known in the art. The wireless communication links 138, 139 can utilize Very High Frequency (VHF) and satellite communication frequency equipment.

To update the navigational database, the airline operator or data service provider uses the remote communication unit 134 to upload navigation data to the first local communication unit 136 via the first wireless communication link 138. The uploaded navigation data is transferred from the local communication unit 136 to the aircraft flight management computer 122 via the sixth data bus 142. The aircraft flight management computer 122 can also use the first wireless communication link 138 to download flight plan information to the remote communication unit 134. This flight plan data can then be transferred to the air traffic control system. In addition, fault reports generated by the aircraft data acquisition unit 120 can be transferred to the first local communication unit 136 via the fifth data bus 140 so that the reports can be downloaded via the first wireless communication link 138.

The system 110 is also capable of transmitting (i.e., uploading and/or downloading) engine control data between the airline operator or a data service provider and the ECU 114 using the second local communication unit 137. For example, when the second wireless communication link 139 is established between the remote communication unit 134 and the second local communication unit 137, data messages containing ECU data, such as ECU software updates, can be sent to the second local communication unit 137 by the airline operator or data service provider. These messages are transferred from the second local communication unit 137 to the ECU 114 via the dedicated seventh data bus 144. Upon successful completion of the data transfer and storage in the ECU memory, a message confirming the successful data transfer is transmitted from the ECU 114 to the airline operator or data service provider via the second wireless communication link 139. A checksum value of the new ECU memory contents or other verification method could be part of the confirmation message. This process can be used to upload not only ECU software updates, but also adjustment values for engine control logic and information for future download reports.

The second wireless communication link 139 can also be used to download ECU fault reports to the airline operator or data service provider. The ECU logic is set up to transmit fault data either immediately upon occurrence of an event, at a specific flight condition (e.g., descent or landing), or upon an uplinked request from the airline operator or data service provider. The fault report is transferred from the ECU 114 to the second local communication unit 137 via the seventh data bus 144. The fault report is then transmitted from the second local communication unit 137 to the remote communication unit 134 via the second wireless communication link 139.

The system 110 of the second embodiment is different from the first embodiment in that the dedicated second local communication unit 137 eliminates use of destination codes or other schemes to direct ECU data messages through the aircraft data processor unit and the aircraft data acquisition unit. By having a direct connection between the second local communication unit 137 and the ECU 114, the system 110 increases flexibility in transmitting data to and from the aircraft. This direct communication link allows the airline operator or data service provider to upload data without having other avionics equipment operational. The direct communication link also allows the ECU 114 to download not only fault reports but also "near real time" engine and aircraft data.

There can be two approaches for creating these "near real time" data downloads. First, if the second local communication unit 137 uses a wireless system that requires data to be formatted into structured reports, the ECU 114 will create a series of time-history reports of engine and aircraft data. These reports are transmitted to the remote communication unit 134 so the airline operator or data service provider can recreate the continuous data stream. Second, if the second local communication unit 137 uses a wireless system that can transmit unformatted streams of data, then the ECU 114 will generate the engine and aircraft data outputs for these transmissions. The aircraft and engine parameters to be transmitted and their update rates could be defined by an uplink message using the same wireless link. Another uplink message could be used to turn on or off these "near real time" data transmissions.

While specific embodiments of the present invention have been described, it will be apparent to those skilled in the art that various modifications thereto can be made without departing from the spirit and scope of the invention as defined in the appended claims.

What is claimed is:

1. A system for transmitting data between an engine control unit of an engine and a remote communication unit, said system comprising:
   an engine communication unit having means for establishing a wireless communication link with said remote communication unit independent of a vehicle communication unit; and
   means for transferring engine control data received from said remote communication unit, from said local communication unit to said engine control unit and engine parameter data from said engine control unit to said engine communication unit.

2. The system of claim 1 wherein said means for transferring data includes a direct data bus between said engine communication unit and said engine control unit.

3. The system of claim 1 wherein said means for transferring data includes a data acquisition unit, a data processor unit, a data bus connected between said engine communication unit and said data acquisition unit, another data bus connected between said data acquisition unit and said data processor unit, and yet another data bus connected between said data processor unit and said engine control unit.

4. The system of claim 3 wherein said means for transferring data further includes a direct data bus between said engine communication unit and said engine control unit.

5. The system of claim 1 wherein said engine communication unit is disposed on a respective craft powered by said engine and said remote communication unit is not disposed on said respective craft.

6. The system of claim 1 further comprising an additional local communication unit having means for establishing a wireless communication link with said remote communication unit.

7. A system for transmitting engine control data in connection with an engine, said system comprising:
   an engine control unit associated with said engine;
   a remote communication unit;
   an engine communication unit having means for establishing an independent wireless communication link with said remote communication unit; and
   means for transferring engine control data from said engine communication unit to said engine control unit and engine parameter data from said engine control unit to said engine communication unit.

8. The system of claim 7 wherein said means for transferring data includes a direct data bus between said engine communication unit and said engine control unit.

9. The system of claim 7 wherein said means for transferring data includes a data acquisition unit, a data processor unit, a data bus connected between a vehicle communication unit and said data acquisition unit, another data bus connected between said data acquisition unit and said data processor unit, and yet another data bus connected between said data processor unit and said engine control unit.

10. The system of claim 9 wherein said means for transferring data further includes a direct data bus between said engine communication unit and said engine control unit.

11. The system of claim 7 wherein said engine communication unit is disposed on a craft powered by said engine and said remote communication unit is not disposed on said craft.

12. The system of claim 7 further comprising an additional local communication unit having means for establishing a wireless communication link with said remote communication unit.

13. A method for transmitting data between an engine control unit of an engine and a remote communication unit, said method comprising:
   providing an engine communication unit;
   establishing a wireless communication link between said engine communication unit and said remote communication unit;
   transmitting engine parameter and engine control data via said wireless communication link; and
   transferring engine control data from said engine communication unit to said engine control unit and engine parameter data from said engine control unit to said engine communication unit.

14. The method of claim 13 wherein a direct data bus between said engine communication unit and said engine control unit is used to transfer data between said engine communication unit and said engine control unit.

15. The method of claim 13 wherein a data acquisition unit, a data processor unit, a data bus connected between a vehicle communication unit and said data acquisition unit, another data bus connected between said data acquisition unit and said data processor unit, and yet another data bus connected between said data processor unit and said engine control unit are used to transfer data between said vehicle communication unit and said engine control unit.

16. The method of claim 13 wherein said engine communication unit is disposed on a craft powered by said engine and said remote communication unit is not disposed on said craft.

17. The method of claim 13 further comprising transmitting a confirmation message from said engine communication unit to said remote communication unit via said wireless communication link upon completion of a successful data transmission.

18. A method for transmitting engine control data in connection with an engine, said method comprising:

providing an engine control unit associated with said engine;

providing a remote communication unit;

providing an engine communication unit establishing an independent wireless communication link between said engine communication unit and said remote communication unit;

transmitting engine control data between said engine communication unit and said remote communication unit via said wireless communication link; and transferring engine control data from said engine communication unit to said engine control unit and from said engine control unit to said engine communication unit.

19. The method of claim 18 wherein a direct data bus between said engine communication unit and said engine control unit is used to transfer engine control data between said engine communication unit and said engine control unit.

20. The method of claim 18 wherein a data acquisition unit, a data processor unit, a data bus connected between a vehicle communication unit and said data acquisition unit, another data bus connected between said data acquisition unit and said data processor unit, and yet another data bus connected between said data processor unit and said engine control unit are used to transfer data between said vehicle communication unit and said engine control unit.

21. The method of claim 18 wherein said engine communication unit is disposed on a craft powered by said engine and said remote communication unit is not disposed on said craft.

22. The method of claim 18 further comprising transmitting a confirmation message from said engine communication unit to said remote communication unit via said wireless communication link upon completion of a successful engine control data transmission.

* * * * *